Nov. 20, 1956  H. L. WILLIAMS  2,771,247
CONSTANT HUMIDITY APPARATUS
Filed April 4, 1952  2 Sheets-Sheet 1
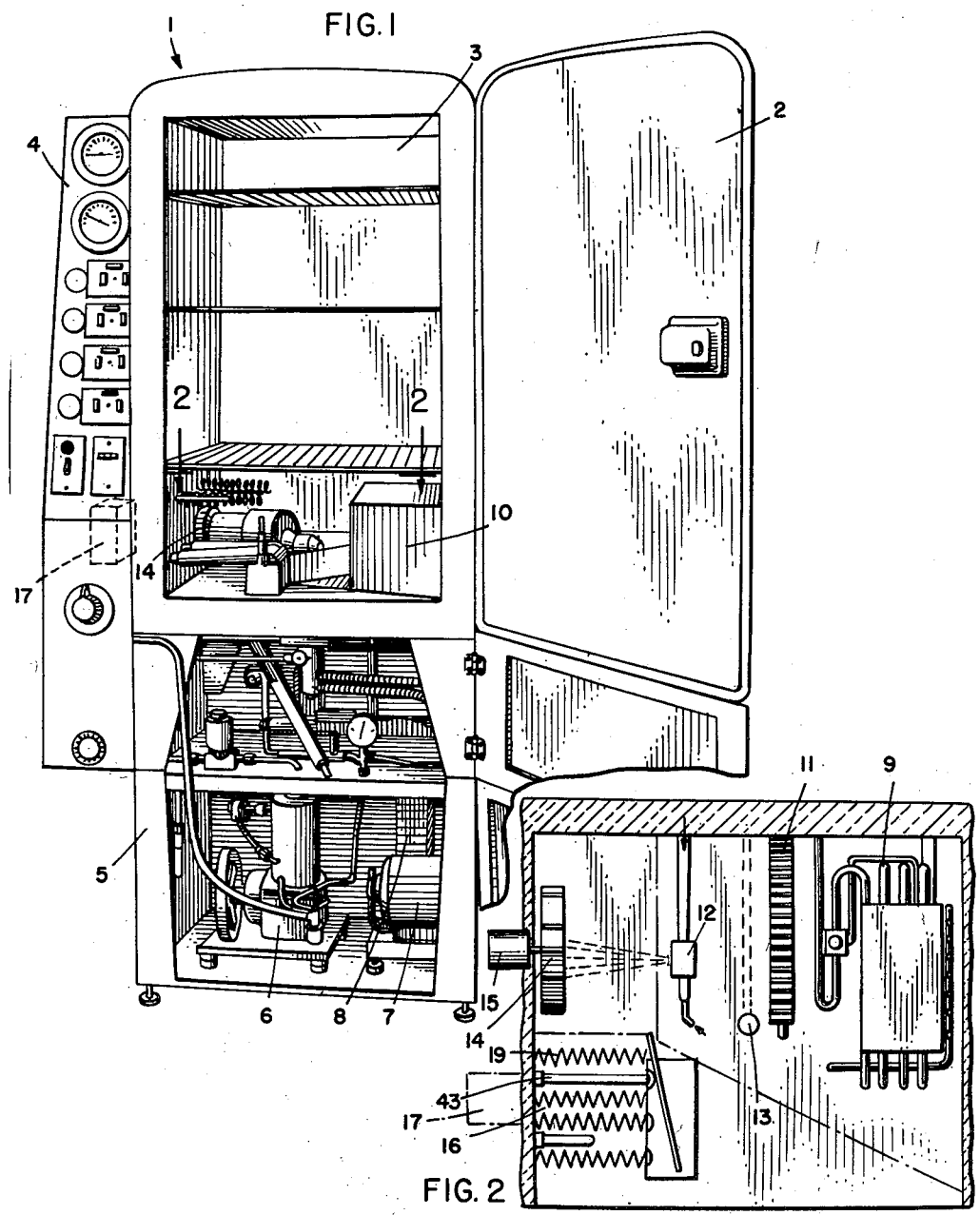
INVENTOR:
HENRY L. WILLIAMS
BY
ATT'YS Nov. 20, 1956  H. L. WILLIAMS  2,771,247
CONSTANT HUMIDITY APPARATUS
Filed April 4, 1952  2 Sheets-Sheet 2

INVENTOR:
HENRY L. WILLIAMS
BY
ATT'YS

United States Patent Office 2,771,247
Patented Nov. 20, 1956

2,771,247

CONSTANT HUMIDITY APPARATUS

Henry L. Williams, Park Ridge, Ill., assignor to Food Technology, Inc., Chicago, Ill., a corporation of Illinois Application April 4, 1952, Serial No. 280,677

3 Claims. (Cl. 236—44)

This invention relates to the control of humidity and particularly to a constant humidity chamber in which the humidity is controlled by adding water in small increments at measured intervals.

Constant temperature and humidity chambers are well known and may take the form of simple boxes with conventional means for adding moisture and heat or they may be very elaborate cabinets in which both temperature and humidity may be adjusted over wide ranges. Prior to this invention, however, the addition of moisture to increase the humidity in the chamber has always presented a difficult problem of control. As a result it has been impossible to maintain humidity within closely controlled ranges. A more serious complication results from the delayed response of the humidity-sensitive element which results in the addition of too great a quantity of water and the formation of condensate within the chamber and on the articles being stored therein. This phenomenon of adding water in too great quantities is called "overrun" and prior to this invention it was customary to find damp surfaces and even small pools of water in a constant humidity chamber following the addition of water thereto.

It is an object of this invention to provide an apparatus for raising the humidity in a chamber without causing damp surfaces and local over-humidification.

Another object of the invention is to provide a constant humidity chamber in which the humidity may be controlled precisely and overrun prevented.

A further object of the invention is to provide a constant humidity chamber in which the humidity can be maintained accurately over a wide range of temperatures and humidities.

Still another object of the invention is to provide a method of intermittently adding water to a chamber to adjust the humidity thereof.

A further object of the invention is to provide an apparatus for adding water to a chamber in small increments at measured intervals.

The foregoing and numerous other important objects, advantages and inherent functions of the invention will become apparent as the same is more fully understood from the following description, which taken in connection with the accompanying drawings, discloses a preferred embodiment of the invention.

In the drawings:

Figure 1 is a perspective view of one form of constant temperature and humidity chamber embodying the present invention;

Figure 2 is a sectional view of the chamber taken along the lines 2—2 of Figure 1;

Figure 3:
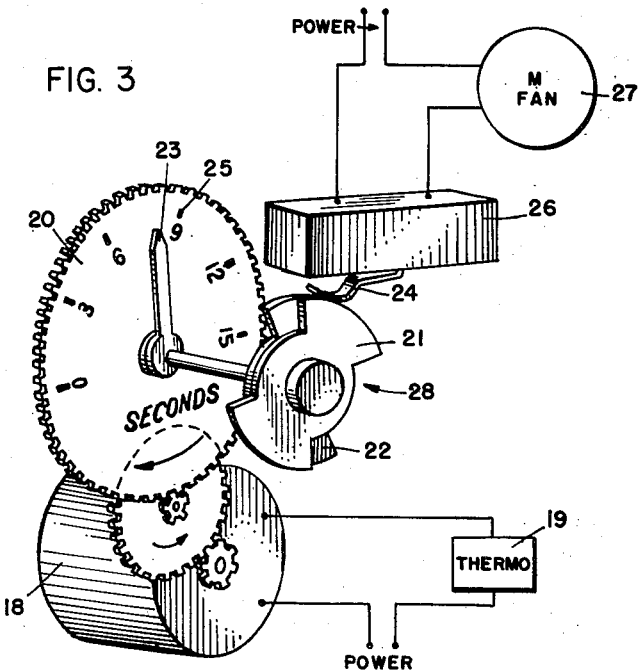
Figure 3 is a diagrammatic view of the thermostatically controlled timing device of the invention.

In accomplishing the foregoing objects and in accordance with the invention, there is now provided a constant humidity chamber in which the humidity can be controlled accurately over a wide range of temperatures and humidities and in which overrun or excessive humidity in the chamber is prevented. These advantages are accomplished in the constant humidity chamber by the combination of means for adding water to the chamber in response to the impulse of a humidity-sensitive element and means for interrupting the flow of water at timed intervals. It was found that by the use of such a combination the amount of water added at each interval is absorbed by the air within the chamber before the next increment of water is added. In this way local overrun or excessive moisture is prevented and condensation thereof on the surfaces of the chamber and on articles stored therein is prevented. In this manner also the humidity within the chamber is raised by small increments and the humidity-sensitive element, such as a wet bulb thermometer, has ample time to adjust and record the increasing humidity. Hence, the wet bulb thermometer is able to shut off the flow of water at the precise moment that the humidity within the chamber reaches the desired level. This is a distinct advancement over previously known apparatus which sprayed water into the chamber continuously until the wet bulb thermometer and thermostat operated to shut off the spray. Invariably too much water was added with the undesirable results previously described.

Referring to the drawings in greater detail it will be seen from Figure 1 that the constant humidity chamber is in the form of an insulated cabinet 1 similar to a conventional refrigerator. A door 2 is provided for isolating the chamber 3. An instrument panel 4 is attached to the side of the cabinet 1 and the instruments located therein provide automatic control over the various pieces of equipment located in the bottom portion 5 of the cabinet 1. In Figure 1 a compressor 6 provides refrigeration for the cabinet 1 through conventional mechanism which need not be described in detail. A motor 7 drives an air compressor 8 which provides a source of pressurized air which is utilized in atomizing water for addition to the cabinet 1, as will be described in more detail hereinafter. Other mechanism located in the portion 5 includes a drying tube, heat exchangers and conventional filter and strainer devices.

For the purposes of this invention it is necessary only to describe the apparatus shown in the bottom shelf of the chamber 3 in detail. A cooling coil 9 (Fig. 2) is located beneath the cover 10 at one side of the space and a heating element 11 and water spray 12 may also be located thereunder. A drain 13 is provided in the floor of the chamber 3 to discharge any water which may collect thereon. A fan 14 is located alongside one wall of the chamber 3 and is adapted to be driven by the motor 15 located outside the cabinet. The spray nozzle 12 and the fan 14 are adjusted so that the fan will pick up the spray and distribute it quickly throughout the chamber 3. A group of temperature and humidity-sensitive elements 16 are located within the chamber 3 and are adapted to record the temperature and humidity and to transmit these values to thermostats and relays in the control panel 4. These elements are of conventional design and hence need not be described in further detail. The thermostats operating from the elements 16 are likewise of conventional design and operate in conjunction with the elements to control the temperature and humidity within the chamber 3. A timer 17 is illustrated as being attached to the cabinet 1 and the function thereof will be more fully described hereinafter.

In Figure 3 the timing mechanism is shown diagrammatically as being comprised of a motor 18 which is connected to a suitable power source and is adapted to be energized through the thermostat 19 which in turn is sensitive to a wet bulb thermometer 43 (Fig. 2). Through a suitable arrangement of gears the motor 18 drives a large timing wheel 20 which has attached thereto for rotation therewith a fixed segment 21 of the cam 28. A movable segment 22 of the cam is connected to the pointer 23 for movement therewith and it will be seen that the two segments 21 and 22 of the cam 28 can be adjusted so that the rider 24 will be depressed through a predetermined portion of the rotational cycle of the wheel 20. The indicia 25 on the face of the wheel 20 provides a convenient means for setting the pointer 23 and with it the movable segment 22 so that the time interval in which the rider 24 will be depressed can be adjusted at will. When the rider 24 is depressed, the switch 26 is inactivated and the motor 27 does not operate. As the wheel 20 revolves, the notched portions of the cam 28 allow the rider 24 to enter therein and cause engagement of the switch 26, thereby operating the motor 27.

Figure 4:
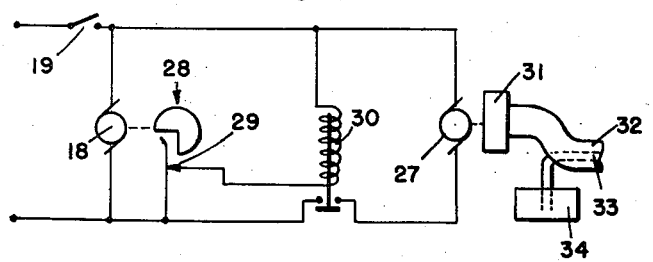
Figure 4 is an electrical diagram showing a simplified circuit for use in the invention.

With reference to the wiring diagram in Figure 4 the operation of the water-adding mechanism depends upon the position of the thermostat 19. When the thermostat closes in response to an impulse on the wet bulb thermometer 43 within the chamber 3, the motor 18 begins to operate and revolve the cam 28. The cam 28 causes intermittent engagement of the switch 29 which actuates a relay 30 and supplies current to the motor 27. This motor in turn drives the compressor 31 which forces air through the conduit 32 and draws water through the conduit 33 from the reservoir 34. This mixture of air and water is forced through the vaporizing nozzle 12 (Fig. 2) where it strikes the fan 14 and is rapidly distributed throughout the chamber 3. It will be apparent by reference to Figure 3 that the motor 18 will continue to revolve as long as the thermostat 19 is closed but that the motor 27 will be actuated only at the intervals when the rider 24 (Figure 3) enters the depressed portions of the cam 28. By adjustment of the pointer 23 with respect to the wheel 20 it is possible to regulate this interval to any desired figure. For example, it is possible to so regulate the mechanism that the motor 27 operates for six seconds out of each minute, or three seconds out of each 30 seconds.

Figure 5:
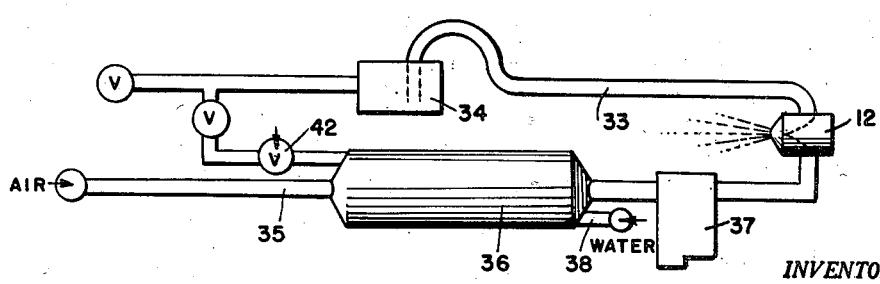
Figure 5 is a piping diagram of a simplified arrangement according to the invention.

In the piping diagram illustrated in Figure 5 it will be seen that air is supplied through the line 35 and passes through the heat exchanger 36 and the trap 37 before entering the nozzle 12. Water is admitted through the line 38 to maintain a desired level in the tank 34 from which it is withdrawn through the conduit 33 and mixed with air in the nozzle 12. The water may be drawn through the heat exchanger 36 and the flow thereof may be controlled by the solenoid operated valve 42. The nozzle 12 is of a conventional design in which the passage of air therethrough creates a suction which tends to draw water from the storage tank 34. It will be apparent that moisture will be emitted from the nozzle 12 only when air is passing therethrough. Hence, the system shown herein for controlling the operation of the fan or compressor 31 is effective to regulate the flow of moisture into the chamber. The compressor 8 in Figure 1 is one form of a fan or compressor illustrated diagrammatically at numeral 31 in Figure 4 and the motor 7 is representative of the motor 27 diagrammatically illustrated in Figures 3 and 4.

In the operation of the device the humidity within the chamber 3 is recorded on the wet bulb thermometer 43 (Figure 2) and the humidifier thermostat or humidistat 19 is operable in response to changes of humidity. When the humidity within the chamber 3 has fallen below the desired level to actuate the humidistat 19 the circuit is closed and the motor 18 in the timing mechanism is started. The motor rotates the cam mechanism which has been pre-set to actuate the switch 26 through a portion of the rotational cycle of the cam. The switch 26 operates the motor 27 for the selected interval and the motor 27 drives the compressor 31 which furnishes compressed air to the nozzle 12 and draws water to the nozzle for mixture and ejection therefrom with the air. With each rotation of the cam mechanism a small increment of water is sprayed in the chamber and is circulated by the fan 14. For example, the cam may be adjusted to operate the compressor for a selected interval of say about three seconds out of each 30 seconds of operation. Then moisture will be sprayed into the chamber for a three second interval and for the following 27 seconds this amount of moisture will be distributed throughout the chamber by means of the circulating fan. At the end of the 27 second interval, the humidity within the chamber will be substantially constant in all portions thereof and the wet bulb thermometer 43 and the humidistat 19 will have recorded the change in humidity resulting from the previous addition. This cycle is repeated until the humidistat 19 operates to break the circuit and stop the motor 18. In this manner it will be apparent that the humidity will be built up gradually and will not exceed the selected upper limit.

It will be apparent that numerous other arrangements of the mechanism may be employed to achieve a similar result. For example, by reference to Figures 3 and 4 it will be apparent that the control 19 may be placed at several other positions in the diagrams. For example, the motor 18 and cam 28 may run continuously and the humidistat 19 may be connected in the circuit between the compressor motor 27 and the switch 26 to achieve substantially the same result of feeding water intermittently in response to the operation of a humidity sensitive element.

A constant temperature and humidity cabinet of the type described herein has a large number of uses, particularly in laboratory testing and analysis. For example, units are available which provide a wide range of controllable temperatures between 40° F. and 140° F. and with controllable humidities between 30° and 98°. All of the mechanism can be adjusted for automatic operation to maintain the desired temperatures and humidities within carefully controlled ranges.

It is thought that the invention and its numerous attendant advantages will be fully understood from the foregoing description, and it is obvious that numerous changes may be made in the form, construction and arrangement of the several parts without departing from the spirit or scope of the invention or sacrificing any of its attendant advantages, the form herein disclosed being a preferred embodiment for the purpose of illustrating the invention.

The invention is hereby claimed as follows:

1. In a constant humidity chamber the combination with a chamber of a fan adapted to circulate air in said chamber, a spray nozzle arranged to discharge water into said fan for distribution of the water, means for supplying compressed air to said nozzle responsive to the impulse of a humidity-sensitive element in said chamber, said means being adapted to draw water to said nozzle when air is passed therethrough and intermittently operable mechanism operable in response to said impulse of said humidity-sensitive element for interrupting the operation of said first named means, said mechanism including a driven adjustable cam, a motor for driving said cam, and an electrical switch connected to said first named means for interrupting the operation thereof adapted to be actuated by rotation of said cam, said motor being operative responsive to said impulse of said humidity-sensitive element.

2. A constant humidity cabinet including, in combination, a humidistat in said cabinet, a fan adapted to circulate air in said cabinet, a spray nozzle arranged to discharge water into said fan for distribution of the water, an air compressor connected to said spray nozzle, an electric motor electrically responsive to the action of said humidistat and arranged to drive said air compressor, a water reservoir connected to said spray nozzle, means for drawing water from said reservoir to said nozzle by the action of compressed air flowing to said nozzle, circuit-breaking means in the electrical circuit to said motor, and electrically operated timing means for controlling the operation of said circuit-breaking means to break said circuit intermittently, said timing means being electrically responsive to the action of said humidistat and operative concurrently with said motor.

3. A constant humidity cabinet including in combination, a humidistat in said cabinet, a fan adapted to circulate air in said cabinet, a spray nozzle arranged to discharge water into said fan for distribution of the water, an air compressor connected to said spray nozzle, an electric motor electrically responsive to the action of said humidistat and arranged to drive said air compressor, a water reservoir connected to said spray nozzle, means for drawing water from said reservoir to said nozzle by the action of compressed air flowing to said nozzle, circuit-breaking means in the electrical circuit to said motor, and electrically operated timing means for controlling the operation of said circuit-breaking means to break said circuit intermittently.

References Cited in the file of this patent

UNITED STATES PATENTS

| | | |
|---|---|---|
| 1,860,377 | Anderson | May 31, 1932 |
| 2,002,294 | McMath | May 21, 1935 |
| 2,026,801 | Ross | Jan. 7, 1936 |
| 2,602,589 | Basinger | July 8, 1952 |

FOREIGN PATENTS

| | | |
|---|---|---|
| 24,033 | Great Britain | 1904 |
| 465,357 | Great Britain | May 5, 1937 |
| 602,402 | Great Britain | May 26, 1948 |